US010802484B2

(12) United States Patent
Jiang et al.

(10) Patent No.: US 10,802,484 B2
(45) Date of Patent: Oct. 13, 2020

(54) PLANNING FEEDBACK BASED DECISION IMPROVEMENT SYSTEM FOR AUTONOMOUS DRIVING VEHICLE

(71) Applicant: Baidu USA LLC, Sunnyvale, CA (US)

(72) Inventors: Yifei Jiang, Sunnyvale, CA (US); Jiangtao Hu, Sunnyvale, CA (US); Jiaming Tao, Sunnyvale, CA (US); Dong Li, Sunnyvale, CA (US); Liyun Li, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 401 days.

(21) Appl. No.: 15/351,128

(22) Filed: Nov. 14, 2016

(65) Prior Publication Data
US 2018/0136652 A1 May 17, 2018

(51) Int. Cl.
*G05D 1/00* (2006.01)
*B60W 30/00* (2006.01)

(52) U.S. Cl.
CPC ........... *G05D 1/0088* (2013.01); *B60W 30/00* (2013.01); *G05D 2201/0213* (2013.01)

(58) Field of Classification Search
None
See application file for complete search history.

(56) References Cited

U.S. PATENT DOCUMENTS

| 8,457,827 | B1 | 6/2013 | Ferguson et al. |
| 9,481,366 | B1 | 11/2016 | Gordon et al. |
| 9,632,502 | B1 * | 4/2017 | Levinson ............. G05D 1/0027 |
| 9,873,428 | B2 * | 1/2018 | Banvait ................ G05D 1/0255 |
| 2012/0310466 | A1 | 12/2012 | Fairfield et al. |
| 2017/0316684 | A1 * | 11/2017 | Jammoussi .......... G08G 1/0112 |
| 2018/0068206 | A1 * | 3/2018 | Pollach ................ G06K 9/3233 |

FOREIGN PATENT DOCUMENTS

| CN | 106094812 | | 11/2016 |
| EP | 2042405 | | 4/2009 |
| EP | 3048021 | | 7/2016 |
| EP | 3048021 | A1 * | 7/2016 .......... B60W 30/095 |

(Continued)

*Primary Examiner* — Shelley Chen
(74) *Attorney, Agent, or Firm* — Womble Bond Dickinson (US) LLP

(57) ABSTRACT

In one embodiment, systems and methods are disclosed for a planning-driven framework for an driving vehicle (ADV) driving decision system. Driving decisions are classified into at least seven categories, including: conservative decision, aggressive decision, conservative parameters, aggressive parameters, early decision, late decision, and non-decision problem. Using the outputs of an ADV decision planning module, an ADV driving decision problem is identified, categorized, and diagnosed. A local driving decision improvement can be determined and executed in a short time frame on the ADV. For a long term solution, if needed, the driving decision problem can be uploaded to an analytics server. The driving decision problems from a large plurality of ADVs can be aggregated and analyzed for improving the ADV decisions system for all ADVs.

24 Claims, 11 Drawing Sheets

(56) References Cited

FOREIGN PATENT DOCUMENTS

| | | | | |
|---|---|---|---|---|
| EP | 3048021 B1 * | 8/2017 | ............ | B60W 30/09 |
| JP | 2016139163 A * | 8/2016 | ............ | B60W 30/09 |
| JP | 2016-157837 A | 9/2016 | | |
| KR | 20140043038 | 4/2014 | | |
| WO | 2016098238 | 6/2016 | | |

* cited by examiner

Perception Log 800

| Object | Description | t0 | | | t1 | | | t2 | | |
|---|---|---|---|---|---|---|---|---|---|---|
| | | Speed Mph | Location θ, feet | Orientation | Speed Mph | Location θ, feet | Orientation | Speed mph | Location θ, feet | Orientation |
| 101 | ADV | 26 | 0°, 0.0' | ↑ | 15 mph | 0°, 0.0' | ↑ | 0 | 0°, 0.0' | ← |
| 510 | Car | 25 | -75°, 101' | ↑ | 23 mph | -68°, 81' | ↑ | 21 | -62°, 63' | ↑ |
| 511 | House | 0 | -28°, 111' | - | 0 mph | -29°, 99' | - | 0 | -30°, 92' | - |
| 512 | Man/dog | 3 | +36°, 40' | ↓ | 2.5 mph | +32°, 32' | ↓ | 3.5 | +27°, 38' | ↓ |
| 513 | Crosswalk | 0 | 0°, 15' | - | 0 mph | 0°, 8' | - | 0 | 0°, 1' | - |
| 514 | Lane, Left | 0 | -90°, 3' | - | 0 mph | -90°, 3' | - | 0 | -90°, 3' | - |
| 515 | Lane, Right | 0 | +90°, 4' | - | 0 mph | +90°, 4' | - | 0 | +90°, 4' | - |
| ... | | | | | | | | | | |

FIG. 8A

Driving Log 805

| Driving Attribute | t0 | t1 | t2 |
|---|---|---|---|
| Speed - mph | 26 | 15 | 0 |
| Location - GPS | N 37° 44' 42.05", W 122° 26' 18.05" | N 37° 44' 42.18", W 122° 26' 18.06" | N 37° 44' 42.32", W 122° 26' 18.07" |
| Orientation | North + 3.5° | North + 3.5° | North + 3.5° |
| Accelerator input | 5% | 0% | 0% |
| Brake input | 0% | 10% | 50% |
| Steering input | 0° | 0° | 0° |

FIG. 8B

ADV Driving Decision Log 810

| Object | Description | t0 | t1 | t2 |
|---|---|---|---|---|
| 510 | Car | Overtake | Yield | Stop |
| 511 | House | Ignore | Ignore | Ignore |
| 512 | Mary/dog | Overtake | Stop | Stop |
| 513 | Crosswalk | Overtake | Stop | Stop |
| ... | | | | |

FIG. 8C

Planning Module Feedback for Driving Decision for Object 510 Car at time t1 815

| Decision | Planning Module Feedback |
|---|---|
| Yield to object 510 car | Warning: Object 510 too close to ADV at yield point<br>Parameter: Reduce speed by 10% to increase distance to object car 510 |

FIG. 8D

| Decision Categorization and Local Improvement for Driving Decision for Object 510 Car at time t1 815 |||
| --- | --- | --- |
| Decision | Decision Category | Local Decision Improvement |
| Yield to object 510 car | Aggressive parameter(s) | Decision: Yield to object<br>Parameter: Reduce speed by 10% to increase distance to object car 510 |

FIG. 8E

| Global Improvement for Decision=Yield, Category = Aggressive Parameter 820 ||||||||||| Decision Improvement 823 |
| --- | --- | --- | --- | --- | --- | --- | --- | --- | --- | --- | --- |
| ADV 821 | Features 822 |||||||||| Parameter Modification 850 |
| | ADV 830 ||| Distance 841 | Rel. Pos. 842 | Object 840 |||| Parameter 851 |
| | Speed 831 | Orient. 832 | Lane loc. 833 | | | Speed 843 | Orient. 844 | Lane loc. 845 | Road 846 | |
| 1 | 25 | ↑ | Left 3' | 60' | -72° | 24 | ↑ | undef. | Wet | Decrease speed 2 mph |
| 2 | 32 | ↑ | Left 2' | 80' | +28° | 30 | ↓ | undef. | Dry | Decrease speed 2 mph |
| 3 | 28 | ↑ | Left 2' | 72' | -2° | 30 | → | Left 3' | Dark | Increase lane loc. Left +1.5' |
| GLOBAL CHANGE | 25 | ↑ | Left 2.3' | 68' | ALL | 28 avg. | NC | NC | ALL | |

FIG. 8F

PLANNING FEEDBACK BASED DECISION IMPROVEMENT SYSTEM FOR AUTONOMOUS DRIVING VEHICLE

TECHNICAL FIELD

Embodiments of the present invention relate generally to operating autonomous vehicles. More particularly, embodiments of the invention relate to improving driving decisions made by an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A decision system of an autonomous driving vehicle (ADV) is to guide running of the vehicle in terms of reactions to surrounding obstacles, front traffic lights, and nearby traffic signs (objects). A decision command consists of intent to an object and one or multiple associated parameters of that intent. For example, a decision to a red traffic light could be "stop" associated with a parameter that includes a location of preferred stop line. A decision made by an ADV decision system may not be perfect for one or more reasons. For example, an ADV planning and/or control system may not be able to execute the decision. An ADV planning and control system can follow the decision but may satisfy the ADV one or more decision parameter(s). An ADV decision may cause an uncomfortable riding experience for passengers, or an ADV decision may cause a traffic rule violation. In addition an ADV decision may cause a risky driving situation, or may cause a longer than usual trip time.

BRIEF DESCRIPTION OF THE DRAWINGS

Embodiments of the invention are illustrated by way of example and not limitation in the figures of the accompanying drawings in which like references indicate similar elements.

FIG. 8A illustrates an example perception log, according to some embodiments.

FIG. 8B illustrates an example driving log, according to some embodiments.

FIG. 8C illustrates an example ADV driving decision log according to some embodiments.

FIG. 8D illustrates an example of planning module feedback of a driving decision with respect to an object sensed by an ADV, according to some embodiments.

FIG. 8E illustrates an example of driving decision problem categorization, according to some embodiments.

FIG. 8F illustrates an example of a global improvement of a driving decision, according to some embodiments.

DETAILED DESCRIPTION

Figure 1:
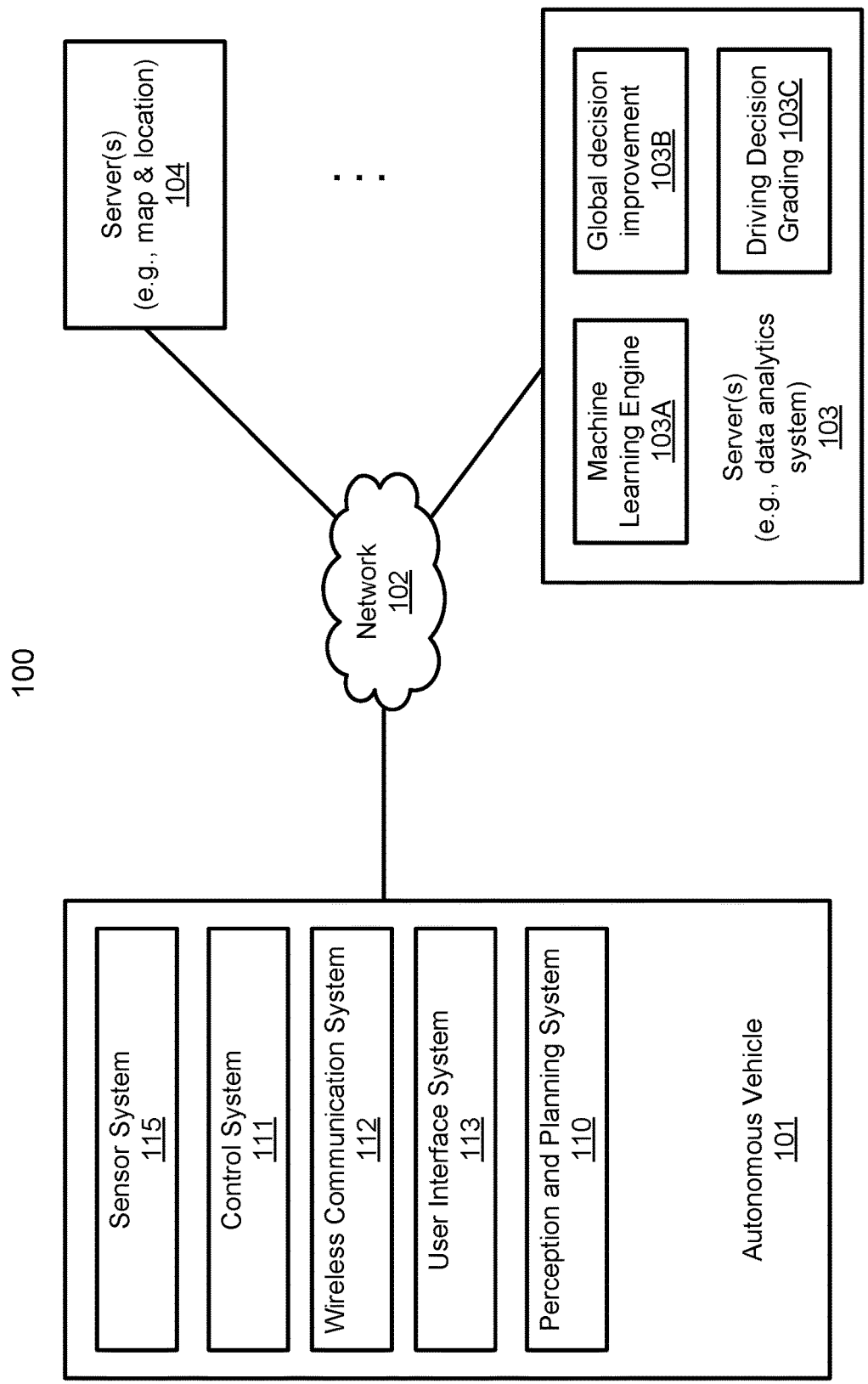
FIG. 1 is a block diagram illustrating an overview of a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a driving scenario can be selected for an autonomous driving vehicle (ADV), such as a route, a destination, or a type of traffic (e.g. freeway, or city driving). As the ADV is operated, a variety of sensors can detect the location, distance, speed, and orientation of objects outside the autonomous vehicle. The sensor outputs can be periodically logged in a perception log. In an embodiment, the sensor outputs can be processed before logging. Driving control inputs, such as use of the steering wheel, accelerator, and brakes by the driver, can also be periodically recorded in a driving log. An autonomous vehicle driving decision module can generate driving decisions in response to the sensor outputs and control inputs. In an embodiment, the driving decisions can be generated logged in an ADV driving decision log. The driving decision can be passed to a planning module that will plan the execution of the driving decision. The driving decision an include a driving decision parameter. For example, if the driving decision is "overtake car," driving decision parameters could include a speed at which the car should be overtaken, a minimum distance between the ADV and the car being overtaken, etc. The planning module may determine that a problem exists with the decision. The planning module may provide feedback to the decision module. Feedback can include a warning that the driving decision cannot be carried out, or is unsafe or aggressive in some manner, a suggested speed, distance or orientation with which to carry out the driving decision, an indication that the driving decision may be being made by the driving decision module too late, or too early, with respect to an object outside the ADV. ADV driving decision module can then categorize the driving decision problem as a conservative decision, an aggressive decision, a decision having a conservative parameter, or an aggressive parameter, an early decision, a late decision, and not a problem with the driving decision module. A local driving decision module can improve the driving decision. After the driving is ended, logging of sensor outputs, control inputs, and autonomous vehicle driving decisions can end. In an embodiment, the perception log, driving log, and ADV driving decision log ("logging information") can be uploaded to a server for analysis.

In another embodiment, a data analytics system can receive logging information for a plurality of ADVs. A global driving decision improvement module can extract logs for ADVs for a particular driving decision to be improved. Global driving decision improvement module can also limit the extracted logs to wherein the driving decision was made with respect to a same object (e.g. a moving car) and with similar driving parameters such as ADV speed, orientation, and direction, similar speed, orientation, distance to the moving car, and the like. Driving parameters can further include planning module feedback and/or a local driving decision improvement. Global driving decision improvement module can form a feature vector of these driving parameters for each ADV. Machine learning can be used to determine a global improvement to the driving decision. An improved decision will optimize driving decision metrics such as safety, passenger comfort, rule compliance with traffic laws and safe driving practices, and time efficiency. A driving decision can be graded based upon these driving decision metrics.

FIG. 1 is a block diagram illustrating an autonomous driving vehicle network configuration 100 according to one embodiment of the invention. Referring to FIG. 1, network configuration 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. An example server system is described below with reference to FIG. 9. Server(s) 103 can include an analytics system that include a machine learning engine 103A and a global decision improvement module 103B, and a driving decision grading module 103C.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Server 103 can include a data analytics system that includes a machine learning engine 103A, a global driving decision improvement module 103B, and a driving decision grading module 103C. Each such module can be implemented in software, hardware, or a combination thereof. In an embodiment, modules 103A, 103B, and 103C comprise at least one hardware processor.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
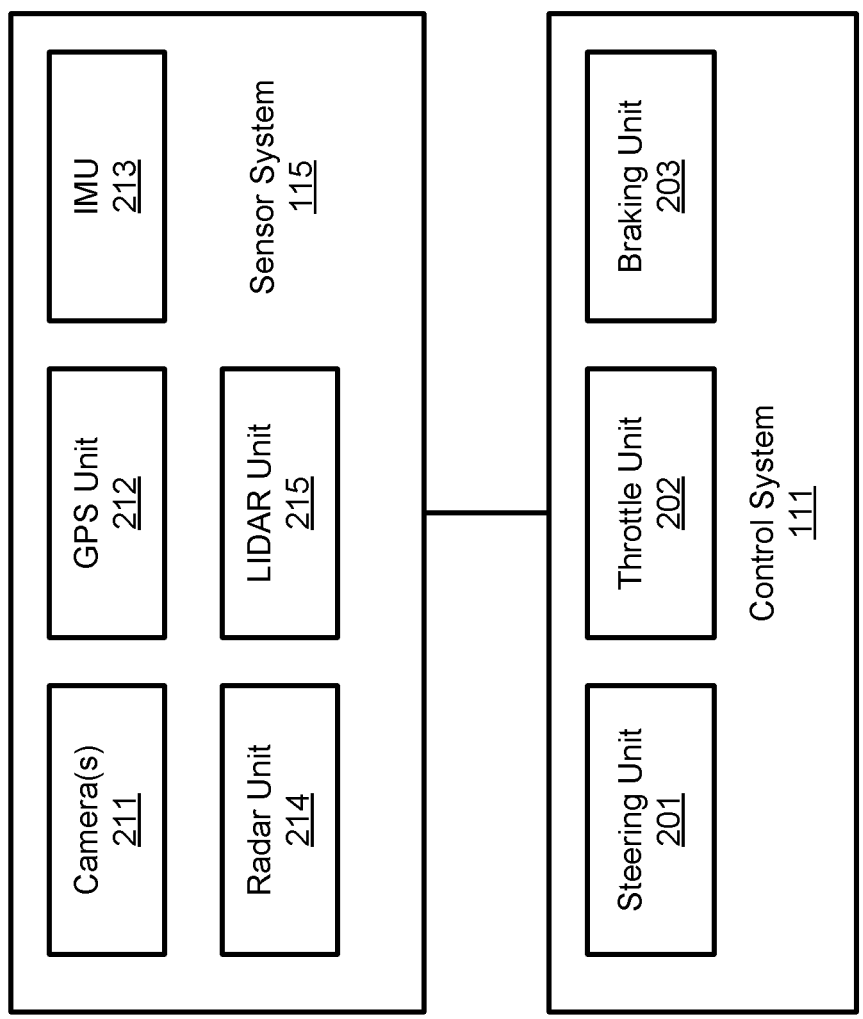
FIG. 2 is a block diagram illustrating an example of an autonomous driving vehicle (ADV) sensor and control module, according to one embodiment of the invention.

FIG. 2 is a block diagram illustrating an example of an autonomous vehicle 101 (AV) sensor and control module, according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. The throttle sensor, steering sensor, and braking sensor output values can be logged in a driving control input log. The sensors that monitor external objects, and speed, position, and orientation of the autonomous vehicle can be recorded in a sensor output, or "perception" log.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can then be driven by a human driver while the planning and control modules are turned off. The embodiments described herein utilize the planning module 110 and control systems 111, which are turned on.

In operations, a user as a passenger may specify a starting location and a destination of a trip, for example, via a user interface 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., a data processing system 110. In such situation, an augmented image is displayed in a virtual reality manner via infotainment system 114, also referred to as an augmented reality manner.

In embodiments described herein, outputs from each sensor in the sensor system 115 can be logged while the autonomous vehicle 101 driven in automated mode, with the planning and control modules turned on. Inputs to components of the control system 111 can be provided by the planning module 110. As the autonomous vehicle 101 is operated, inputs into the steering unit 201, throttle unit 202, and braking unit 203 can be logged into a "driving log" that captures actions taken by the automated control system 111. The sensor log(s) and driving log(s) can be uploaded to server 103. In an embodiment, the sensor and driving log(s) are uploaded in real-time, or near real-time.

Figure 3:
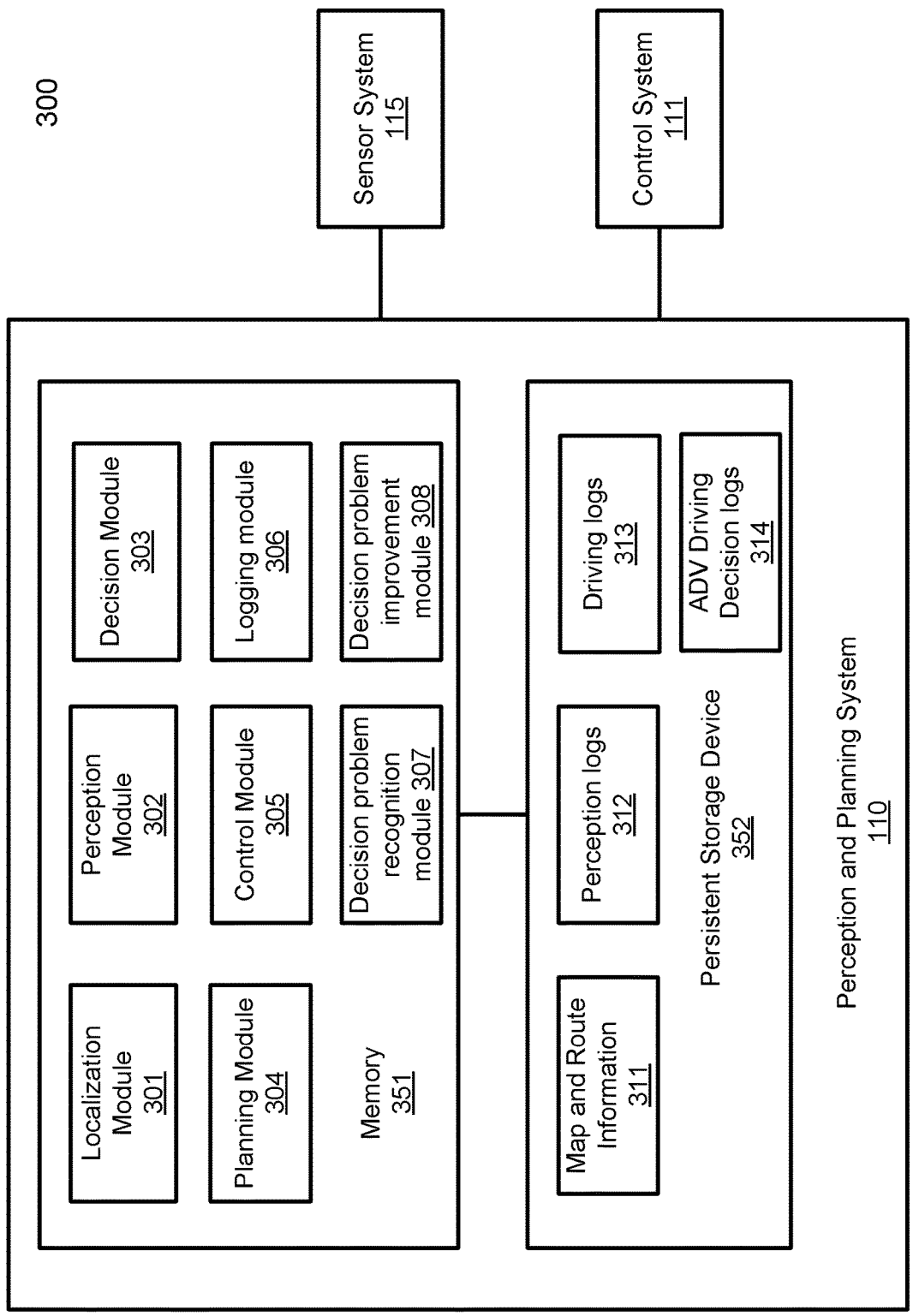
FIG. 3 is a block diagram illustrating an example of an ADV perception and planning system, according to one embodiment of the invention.

FIG. 3 is a block diagram 300 illustrating an example of a perception and planning system 110 used with an autonomous vehicle 101 according to one embodiment of the invention. System 300 may be implemented as a part of autonomous vehicle 101 of FIG. 1 including, but not limited to, perception and planning system 110, control system 111, and sensor system 115. Referring to FIG. 3, perception and planning system 110 includes, but is not limited to, localization module 301, perception module 302, decision module 303, planning module 304, control module 305, logging module 306, decision problem recognition module 307, and decision problem improvement module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 can make a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and steering commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Logging module 306 can receive data from perception module 302, ADV decisions from decision module 303, and control system inputs from control system 111. In an embodiment, control inputs from control system 111 are available, alternatively or in addition, from control module 305. Logging module 306 can receive perception data of objects sensed by sensor system 115 via perception module 302. In an embodiment, perception module 302 can process one or more sensor outputs from sensor system 115, before passing perception information to logging module 306. For example, perception module 302 can determine a location of an object by combining a distance determined by LIDAR with an orientation determined by GPS or RADAR. A location of the object can be passed by perception module 302 to logging module 306 for logging in the perception log, rather than storing raw sensor data. Logging module 306 can write perception log data to perception logs 312 and write driving control inputs to driving logs 313 on persistent storage 352 in ADV 101.

Logging module 306 can receive driving control inputs from control system 111. Driving control inputs can include braking input amount from braking unit 203, steering input amount from steering unit 201, and throttle input amount from throttle unit 202. These inputs are determined by planning module 304 and control module 305.

Logging module 306 can also receive ADV driving decisions from decision module 303. ADV driving decisions can be on a per-object basis. ADV driving decisions can include overtake object, yield to object, stop ADV, or ignore object.

ADV driving decision logs can be stored in ADV decision logs 314 in persistent storage device 352.

Driving logs 313, perception logs 312, and ADV driving decision logs 313 comprise logging information. Logging module 306 can store logging information in real-time, or near real-time in persistent storage 352 of ADV 101. In addition, or alternatively, logging module 306 can transmit logging information to server 103 via network 102. In an embodiment, logging module 306 can transmit logging information to server 103 in real-time or near real-time. In an embodiment, logging module 306 can transmit logging information to server 103 after a driving scenario is completed, or at another time.

Decision problem recognition module 307 can use supervised learning to classify planning feedback into the following decision classes: conservative decision, aggressive decision, conservative parameters, aggressive parameters, early decision, late decision, and non-decision problem. The features used for supervised learning can utilize information obtained from perception module 302, including but not limited to: a distance between an object and the ADV, a relative position of the object to the ADV, a speed of the ADV, an orientation of the ADV, a lane location of the ADV, a speed of the object, an orientation of the object, and a location of the object with reference to the ADV lane position. A labeling process of features may be used prior to supervised learning. Decision categories are described as follows:

A conservative decision may be safer, more compliant with driving rules, and/or more comfortable for passengers, but can cause longer than usual trip time. Such a decision may be modified to be more aggressive. For example, a "stop" decision may be changed to a "yield" or "overtake" decision.

An aggressive decision can cause risky driving situations that are less safe, less comfortable for passengers, or may increase traffic rule violations. If this kind of problem is identified, the driving decision may need to be more defensive. For example, an "overtake" decision need to be changed to "yield."

A conservative parameters decision is similar to a conservative decision except that the decision does not need to be modified. However, parameters of the decision may need to be modified to more conservative parameters. For example, a decision to "overtake" an object may be the best driving decision, but a decision parameter indicating a speed or acceleration at which the ADV is to overtake the object may need to be modified to be more conservative. A parameter may be more conservative if the modified parameter increases safety, passenger comfort, and/or compliance with traffic laws and good practices.

An aggressive decision parameter is similar to an aggressive decision except that the decision does not need to be modified. However, parameters of the decision may need to be modified to more aggressive parameters. For example, a decision to "yield" to an object may be the best driving decision, but a decision parameter indicating a time or amount of braking to execute the yield decision may need to be modified to a more aggressive parameter value. A parameter may need to be more aggressive if the ADV is slowing too soon or too far before the object at the expense of time efficiency. Slowing to yield too soon may also confuse other drivers as to the object that the ADV is yielding to.

An early driving decision is a correct driving decision that is executed too early. As with the yield example, above, the ADV may be slowing to yield to an object too soon. An early driving decision can decrease time efficiency and can confuse other drivers as to what object the ADV is yielding to.

A late driving decision is a correct driving decision that is implemented too late. A late driving decision may cause the ADV to have to brake and decelerate more quickly than is safe for road conditions or passenger comfort. A late driving decision can also surprise other drivers and may cause an accident.

A non-decision problem indicates a problem that is not caused by the driving decision module. No improvement to the decision is needed.

Local decision problem improvement module 308 can use reinforcement learning to find an optimal solution to a driving decision problem. A local driving decision improvement is for a particular ADV only, and it can temporarily fix a driving decision problem by changing the driving decision or modifying driving decision parameter(s).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
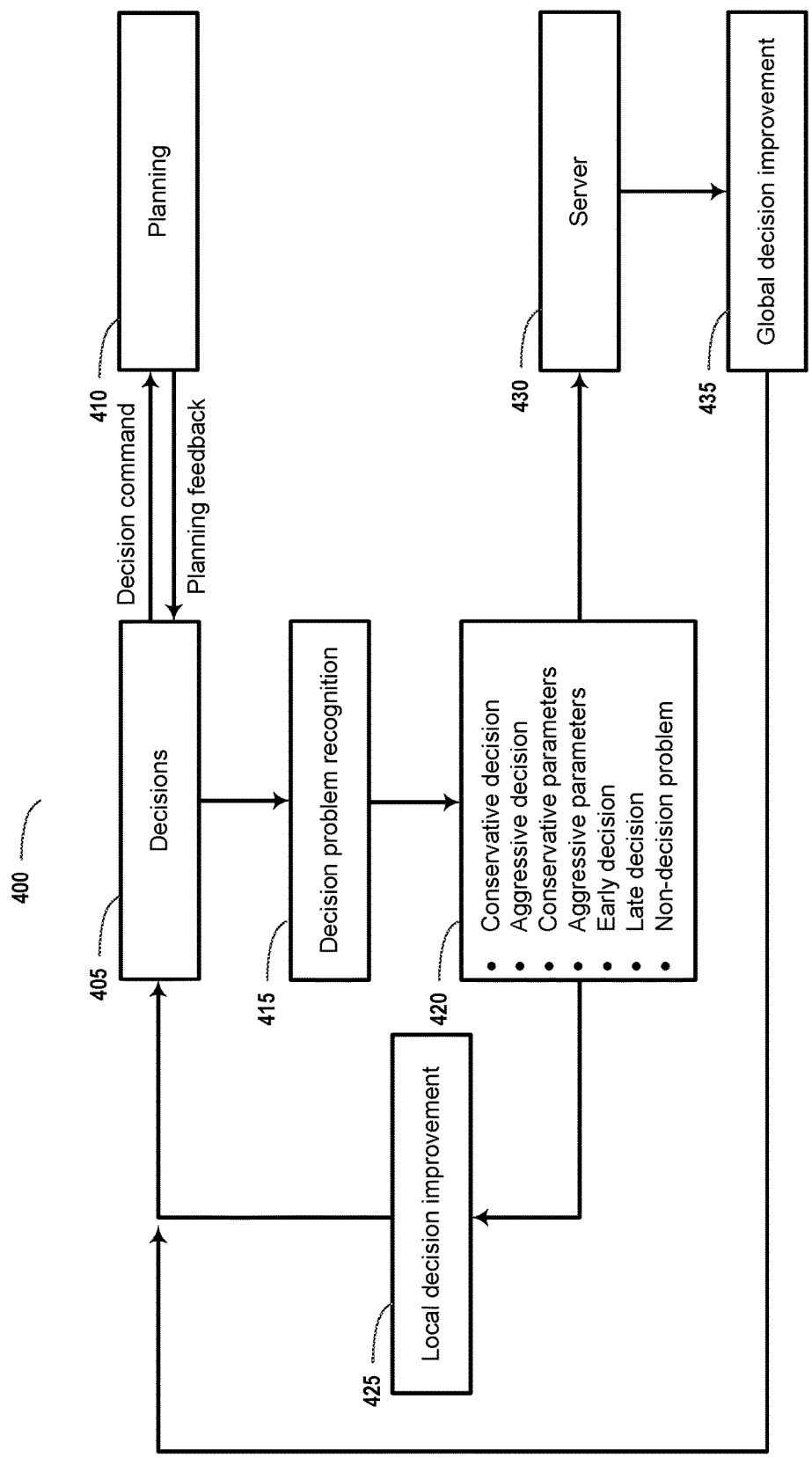
FIG. 4 illustrates, in block form, an overview of a method of a planning feedback based decision improvement system for an ADV, according to some embodiments.

FIG. 4 illustrates, in block form, an overview of a method 400 of a planning feedback based decision improvement system for an ADV, according to some embodiments.

As described above with reference to FIG. 3, an ADV perception and planning system 110 can include a perception module 302, a driving decision module 303, a planning module 304, a control module 305 to execute a driving decision, a logging module 306, a decision problem recognition module 307 to recognize a driving decision problem, and a decision problem improvement module 308 to improve a driving decision. A driving decision can be with reference to an object sensed by perception module 302. A driving decision can include: overtake the object, yield to the object, stop for the object, or ignore the object. Each driving decision can be graded with respect to one or more metrics including: safety of the decision, comfort for the passengers of the ADV, compliance with traffic laws and rules, and time efficiency. A driving decision can include driving decision parameters, such as an amount of throttle input, an amount of braking, or a steering input. The driving decision parameters can be determined by planning module 304. Planning module 304 can additionally evaluate the magnitude of the driving decision parameters, taking into account objects sensed by perception module 302, and can indicate whether the driving decisions parameters may be conservative or aggressive.

In operation 405, decision module 303 can send a driving decision command to the planning module 304. A driving decision command can be a command that the ADV planning module 304 and control module 305 should plan and execute the driving decision.

In operation 410, planning module 304 can receive the driving decision command and generate feedback for the driving decision. Planning module 304 can then send the driving decision and driving decision feedback to the decision module 303. Decision module 303 can then pass the driving decision and decision feedback to decision problem recognition module 307.

In operation 415, the decision problem recognition module 307 can use the planning feedback to recognize a problem with the driving decision. In an embodiment, decision problem recognition module 307 can grade the driving decision using the driving decision feedback.

In operation 420, decision problem recognition module 307 can categorize the driving decision into one of the following categories: conservative decision, aggressive decision, conservative parameters, aggressive parameters, early decision, late decision, or non-decision problem. Supervised learning can be used to categorize planning feedback to the aforementioned seven categories of driving decision problems. The features used for supervised learning can utilize information obtained from perception module 302, including but not limited to: a distance between an object and the ADV, a relative position of the object to the ADV, a speed of the ADV, an orientation of the ADV, a lane location of the ADV, a speed of the object, an orientation of the object, and a location of the object with reference to the ADV lane position. A labeling process of features may be used prior to supervised learning. Decision categories are described above with respect to FIG. 3, driving decision problem recognition module 307. The identified driving decision problem can be sent to both local decision improvement module 308 and a server analytics system 103 global decision improvement module 103B.

In operation 425, local driving decision improvement module 308 can receive the driving decision, driving decision parameters, and planning feedback (driving decision information). The local driving decision improvement is for this ADV only, to temporarily fix a driving decision problem. The local driving decision improvement may not indicate a problem with the decision module 303. A local decision improvement may relate to, e.g., a decision based upon local weather at the time that the driving decision was made. In an embodiment, the local driving decision improvement module 308 can use a reinforcement learning based approach to find an optimal solution for the local decision improvement. The solution can be dynamically changed, e.g., it may change by different location, road type, or weather.

In operation 430, an analytics server, e.g. server 103, can receive driving decision information, and pass the driving decision information to a global decision improvement module 103B. In an embodiment, the global decision improvement module 103B can be implemented on server 103.

In operation 435, global decision improvement module 103B can attempt to permanently fix a problem with the decision module 303. The server 103 can collect driving decision information from multiple ADVs to attempt to identify a common problem across more than one ADV. The global decision improvement module is described in detail below, with reference to FIG. 8F.

Figure 5:
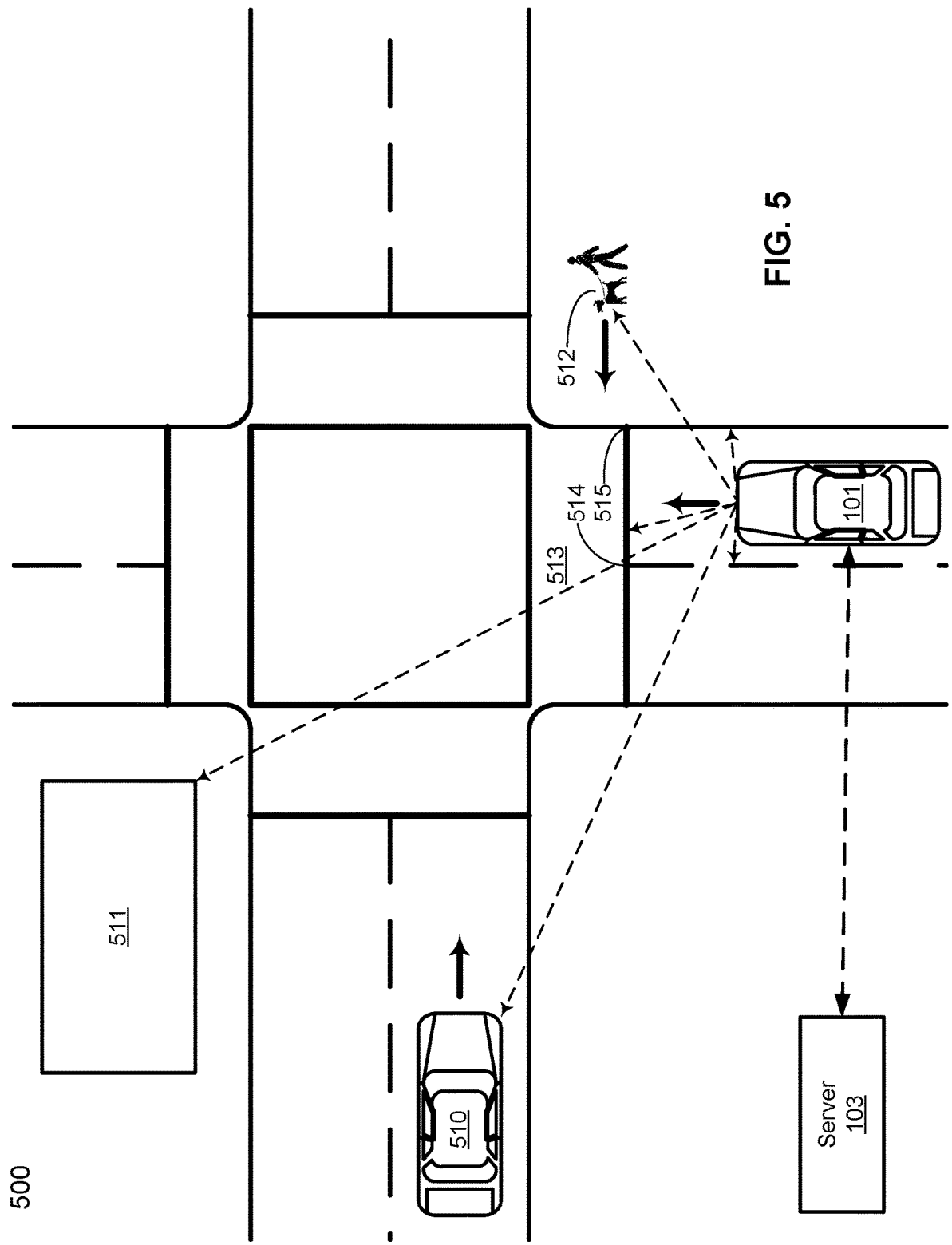
FIG. 5 is an example driving situation in which one or more driving decisions may be made.

FIG. 5 is an example driving scenario 500 in which one or more driving decisions may be made. In the following driving scenario, speed, distance and orientation of objects are with respect to ADV 101. In an embodiment, speed, distance and orientation of objects in the driving scenario can be expressed with respect to a coordinate system such as GPS, or a map coordinate system. In an embodiment in which speed, distance and orientation are relative to ADV 101, orientation of ADV 101 can be 0° or ↑ can mean "straight ahead" of ADV 101, objects travelling left-to-right in front of the ADV can have a positive orientation, e.g. +90° or → such as car 510. Objects traveling right-to-the left in front of the of ADV 101 can have negative orientation, e.g. −90° or ←, such as pedestrian/dog 512.

In this scenario, an ADV 101 is approaching a 4-way intersection having crosswalks 513 at each corner of an intersection. The ADV 101 is in communication with a server 103 that can collect ADV decision logs, driving logs, and perception logs for ADV 101. Also in this scenario are various objects, detected and logged in the perception logs for ADV 101. The objects include an oncoming car 510, a building 511, a pedestrian and a dog 512, left lane marker 514 and right lane marker 515 adjacent to ADV 101.

ADV 101 is approaching the intersection crosswalk 513, at a speed, distance and orientation with respect ADV 101. At a time, t0, ADV 101 may be traveling at 25 mph, at 0° relative to ADV 101 (straight ahead). Car 510 may also be traveling at 25 mph, located at a distance of 101 feet from ADV 101 and −75° relative to ADV 101, and, oriented at +90° with respect to ADV 101. In simple terms, car 510 is about 100 feet away from ADV 101, and approaching the intersection from the left of ADV 101 at 25 mph. At time t0, ADV 101 may make a decision whether to overtake car 510, stop, yield to car 510, or ignore car 510.

ADV 101 can also perceive house 511. Since a house is a stationary object, at time t0, the speed of house 511 will be 0 mph. At time t0, house 511 may be located at −28° relative to ADV 101, and 111 feet away from ADV 101. Since house 511 is stationary, the house 511 has no orientation.

In addition, ADV 101 can also perceive pedestrian and dog 512 (or just, "pedestrian") approaching the intersection, from a different direction. At a time t0, pedestrian 512 may traveling at 3 mph, located at +36° and at a distance of 40' from ADV 101. In simple terms, a man and his dog are approaching the crosswalk 513 from the right at walking speed at about the same time that car 101 is approaching the intersection from left at residential driving speed. If ADV 101, car 510, and pedestrian 512 continue at their current respective speeds, and orientations, then pedestrian 512 may enter the crosswalk 513 at about the same time that car 510 crosses the intersection, at about the same time that ADV 101 will cross the crosswalk and enter the intersection. In some states, by law, a pedestrian entering a crosswalk has a right of way that takes precedence over cars entering an intersection that contains the crosswalk. In some states, when two cars approach an intersection simultaneously, the car on the right (in this case, ADV 101) is required by law to yield to the car on the left (in this case, car 510). In the driving decision problem improvement framework of this disclosure, the ADV 101 will need to make a driving decision that accounts for all objects: ADV 101, car 510, house 511, pedestrian 512, and crosswalk 513. For each object 510-513, a decision is made to overtake the object, yield to the object, stop, or ignore the object.

A driving scenario can include ADV speed, orientation, and location, and distance to one or more objects, each having a speed, location, and orientation. ADV 101 makes objective driving decisions. Given a same, or similar, driving scenario, ADV 101 will make the same driving decision each time. The driving decision may not be optimal. Thus, a local decision improvement module 308 can help obtain a decision closer to optimal for an ADV. A global decision improvement module 103B can help improve decisions for a plurality of ADVs. An ADV driving decision module 303 may decide to overtake car 510 and pedestrian 512 (and thereby, crosswalk 513), and ignore house 511, in order to be the first through the intersection. This decision may break rules including speed, yielding an intersection to another vehicle, and stopping for a pedestrian at a crosswalk, but it will save driving time. The decision may also require acceleration and a possible nudge, or swerve, in lane position to avoid car 510 or pedestrian 512. This may reduce comfort of the passengers as the ADV experiences both forward and lateral acceleration. An alternative, safer decision may be to slow the ADV and yield the intersection to car 510, stopping 5 feet before crosswalk 513 to allow pedestrian 512 to cross the street in crosswalk 513. This decision complies with all laws, increases safety by avoiding a possible collision with car 510 or injury to pedestrian 512, and also provides a comfortable deceleration. But, the decision may be less time efficient.

Figure 6:
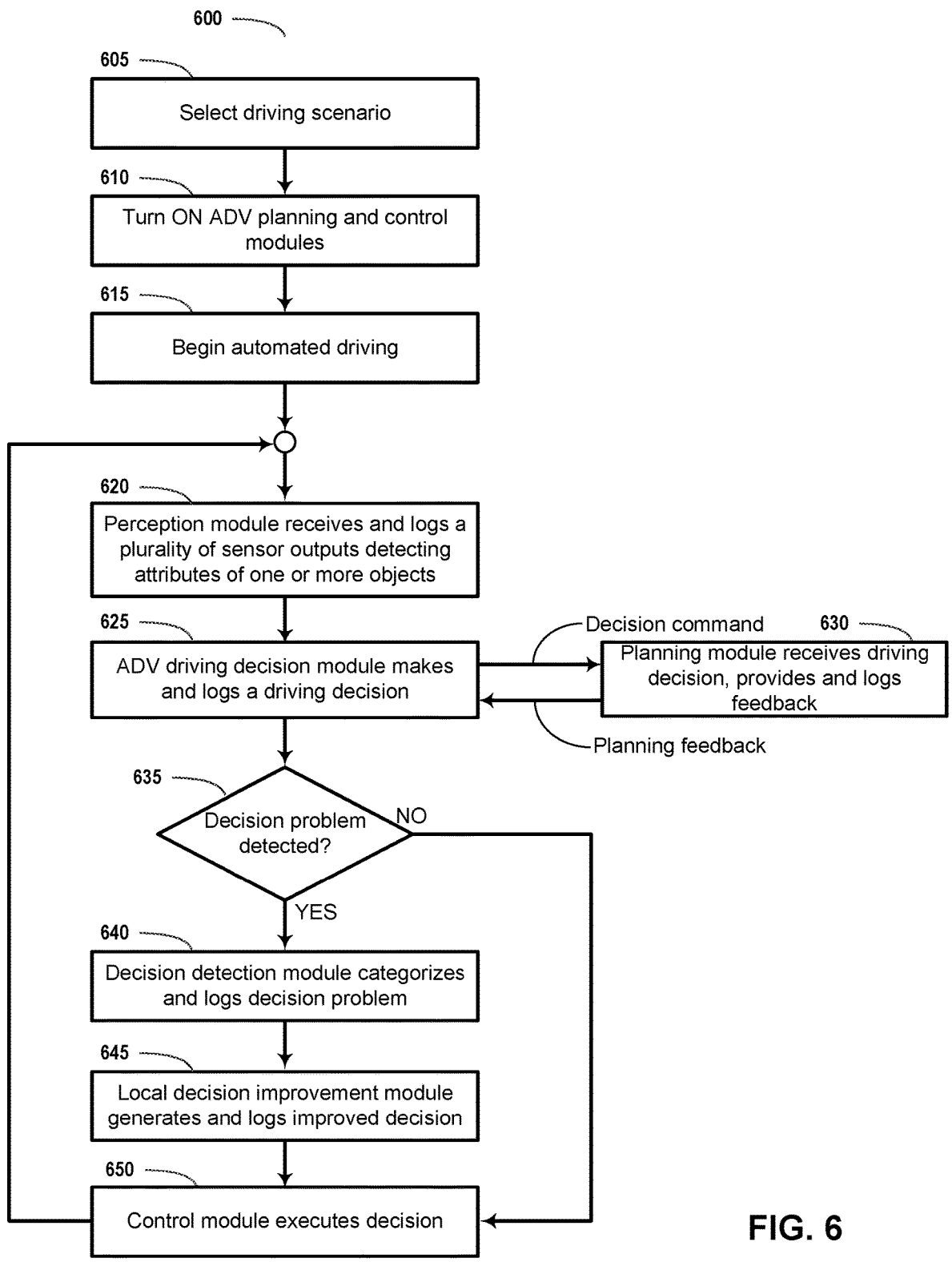
FIG. 6 illustrates, in block form, a method of locally improving a driving decision on an ADV, according to some embodiments.

FIG. 6 illustrates, in block form, a method 600 of improving a driving decision of an ADV using a driving decision problem recognition module 307 and a local driving decision improvement module 308, according to some embodiments. In an embodiment, method 600 can be implemented on-line, in real-time or near real-time. In an embodiment, collected information can be transmitted, e.g. over network 102 to server 103. In addition, or alternatively, collected information can be stored in, e.g. persistent storage device 352 of the ADV while the ADV driving.

In operation 605, a driving scenario can be selected. A driving scenario can include a particular destination, a type of traffic (heavy vs. light), a speed of driving (freeway vs. in town), a time of day (commute traffic vs. weekend traffic, vs. mid-day on a weekday traffic), a length of the trip (short vs. long), whether the human driver is, or is not, familiar with the driving area, and other driving scenarios.

In operation 610, ADV planning and control modules can be turned on. An ADV driving decision module is active, and ADV driving decisions will be made, logged, planned and executed by the ADV.

In operation 615, automated driving of the ADV begins.

In operation 620, logging module 306 can receive outputs from a plurality of sensors in ADV sensor system 115. The plurality of sensor outputs can detect or represent attributes of one or more objects. For example, a camera 211 can detect presence of a moving object, e.g. car 510 or pedestrian 512; LIDAR unit 215 can detect a distance of an object from ADV 101. RADAR unit 214 can detect motion of objects. GPS unit 212 can detect location of objects with respect to GPS coordinates. Driving control inputs are generated when an ADV driving decision is executed by planning module 304 and control module 305. Driving control inputs can include throttle inputs 202 (including deceleration), braking inputs 203, and steering inputs 201 (an amount right, left, or centered). Driving control inputs 111 can also include derivatives of inputs, such as a rate at which an input is applied. The driving control inputs can be passed to logging module 306 for logging.

In operation 625, ADV driving decision module 303 can make and log a driving decision. The ADV driving decision can include driving decision parameters. For example, a driving decision with respect to crosswalk 513 can include a parameter indicating the distance from the crosswalk 513 that the ADV is to stop, e.g. stop 6 feet before crosswalk 513. ADV driving decision module 303 can pass the ADV driving decision and driving decision parameter(s) to planning module 304.

In operation 630, planning module 304 can receive the ADV driving decision and driving decision parameter(s). Planning module 304 can access perception logs 312 to determine the speed, location and orientation of the ADV and the speed, distance and orientation of one or more objects with respect to the ADV. Planning module 304 can access ADV driving logs 313 to determine the current control inputs to throttle, steering, and brakes. Using the perception logs 312, driving logs 313, driving decision and driving decision parameters, planning module 304 can determine driving decision feedback to return to the decision module 303. Decision problem recognition module 307 can use supervised learning to classify planning feedback into the following decision classes: conservative decision, aggressive decision, conservative parameters, aggressive parameters, early decision, late decision, and non-decision problem. The features used for supervised learning can utilize information obtained from perception module 302, including but not limited to: a distance between an object and the ADV, a relative position of the object to the ADV, a speed of the ADV, an orientation of the ADV, a lane location of the ADV, a speed of the object, an orientation of the object, and a location of the object with reference to the ADV lane position. A labeling process of features may be used prior to supervised learning.

In operation 635, driving decision problem recognition module 307 can determine whether the feedback received from planning module 304 indicates a driving decision problem. If a driving decision problem is recognized in operation 635, then method 600 continues at operation 640, otherwise method 600 continues operation 650.

In operation 640, decision problem recognition module 307 classifies the decision problem into one of the categories: conservative decision, aggressive decision, conservative parameters, aggressive parameter, early decision, late decision, and not a problem based in the decision module 303.

In operation 645, local driving decision improvement module 308 can modify a first driving decision having a first driving decision problem type to a second driving decision. Alternatively, or in addition, local driving decision improvement module 308 can modify one or more driving decision parameters of the driving decision to improve the driving decision. For example, if the pavement is wet, or otherwise slippery, local driving decision improvement module 308 may change a driving decision parameter such that the ADV is to stop at the crosswalk 513, instead of stopping 6 feet before the crosswalk 513. Stopping too quickly could result in the ADV losing tracking and possibly being unable make a controlled stop. If a driving decision is "stop at crosswalk 513" and the decision is made too early, then driving decision improvement module 308 may delay execution of the stop at crosswalk 513 decision, or change a driving parameter to decelerate for the crosswalk 513 at a reduced rate so that the ADV does not slow too quickly. If a driving decision is "stop at crosswalk 513" and driving decision categorization indicates "late decision," then driving decision improvement module may alter the decision to "overtake crosswalk 513." Driving decision improvement module 308 can use road conditions, known or estimated ADV properties, such as maximum acceleration rate, minimum stopping distance without losing traction, a minimum turning radius for a given speed, overturn characteristics of the ADV, et al. in determining how to improve a driving decision.

In operation 650, control module 305 can execute the driving decision, as may be modified by location decision improvement in operations 640 and 645. Method 600 continues at operation 620.

Figure 7:
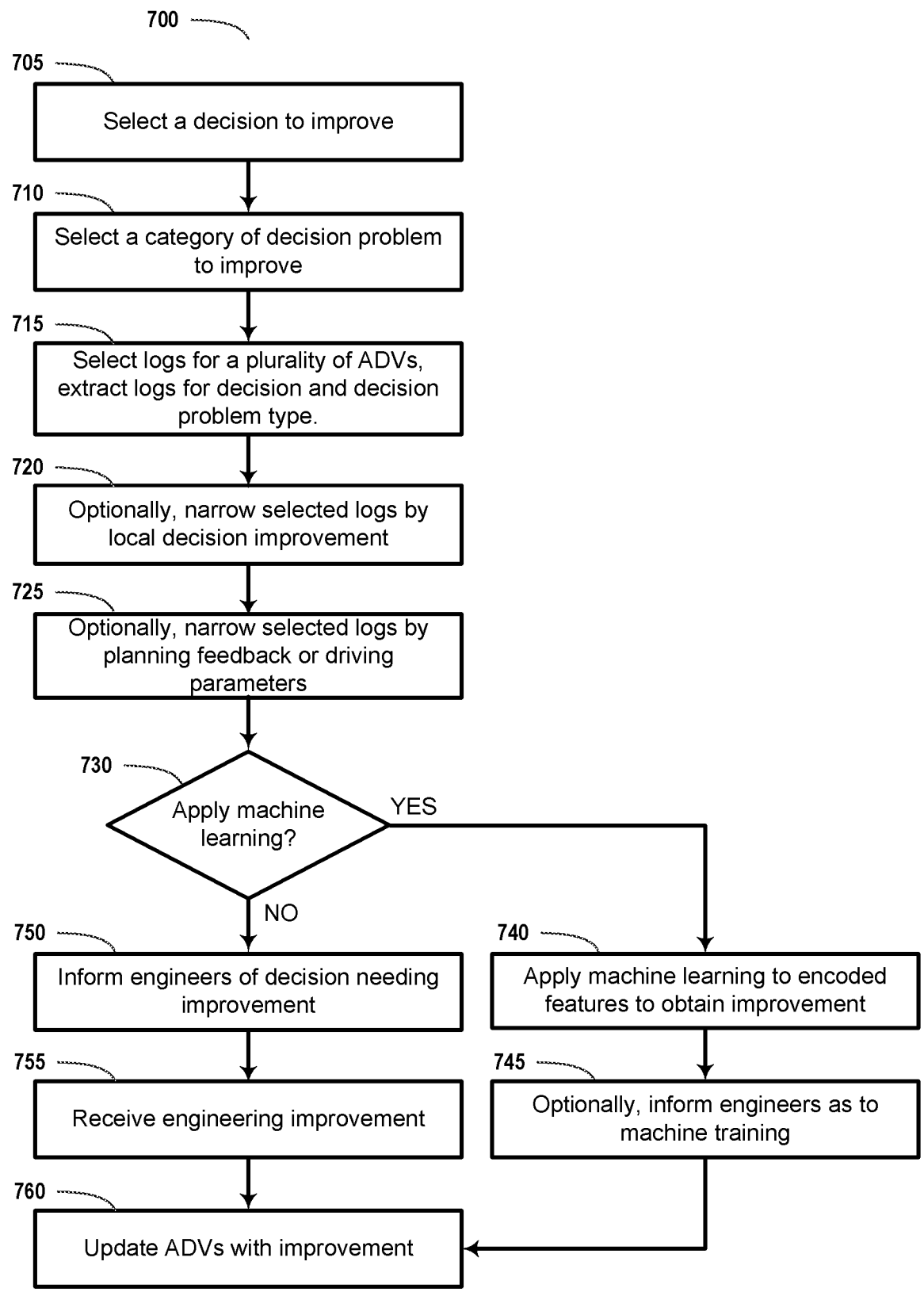
FIG. 7 illustrates, in block form, a method of globally improving a driving decision for a plurality of ADVs, according to some embodiments.

FIG. 7 illustrates, in block form, a method 700 of globally improving driving decisions for a plurality of ADVs using offline analytics on a server 103. In an embodiment, global driving decision improvement module 103B on server 103 can receive perception logs, driving logs, and driving decision logs (collective, "logging information") from a large plurality of ADVs. One or more subsets of the logging information can be extracted to improve a category of driving decision problem, or a particular decision type. Not all problems can, or should, be solved solely by automated machine learning. In an embodiment, certain categories of driving decisions may be reviewed by engineers. In an embodiment, all driving decisions, and their respective improvements, will be reviewed by a human engineer, even if the method 700 automatically generates an improvement to a driving decision problem.

In operation 705, global driving decision improvement module 103B can select a driving scenario to narrow the circumstances under which a driving decision problem to be improved may occur. A driving scenario can be a particular route for an ADV, a destination, a traffic type (city vs. highway vs. rural), a time of day, a type of weather condition a maximum or minimum speed, driving with, vs. without, cross-traffic, driving with, vs. without, pedestrians as perceived objects, a particular state, country, or other locality, etc.

In operation 710, global driving decision improvement module 103B can select a category of driving decision problem to be improved. Driving decision problem categories can include: conservative decision, aggressive decision, conservative parameter, aggressive parameter, early decision, late decision and non-problem decision module driving decisions.

In operation 715, global driving decision improvement module 103B can select a subset of available ADV log information to narrow the scope of inquiry for improving a driving decision. In an embodiment, logging information is selected having the same driving decision, driving decision problem, and, optionally, a same or similar driving decision parameter.

In operation 720, global driving decision improvement module 103B can optionally further narrow the scope of inquiry for improving a driving decision by limiting the inquiry to driving decisions having a same, or similar, local driving decision improvement.

In operation 725, global driving decision improvement module 103B can optionally further focus the scope of improvement of a driving decision by requesting logs of ADVs having the same or similar planning feedback or driving parameters.

In operation 730, it can be determined whether the driving decision problem, as may be narrowed by operations 710-725, should apply machine learning to improve the driving decision problem. If so, then method 700 continues at operation 740, otherwise method 700 continues at operation 750.

In operation 740 machine learning is applied to features of the driving decision problem to improve the driving decision. The features used for machine learning can include, but are not limited to: (1) a distance between an object and the ADV, (2) a relative position of the object to the ADV, (3) a speed of the object, (4) an orientation of the object, (5) a location of the object with reference to the ADV lane position (6) a speed of the ADV, (7) an orientation of the ADV, and (8) a lane location of the ADV. Features can be labeled, e.g. with numerals as shown above, and the features can be given values. Features can then be encoded as an ordered set of values that can be used for machine learning. For example, an object can be a car, and the driving decision can have the following features: (1) car is 100' from ADV, (2) car is at −72° relative to the ADV, (3) car is traveling at 25 mph, (4) car is traveling at +90° with respect to ADV direction, (5) car is at 60' to the left of ADV driving lane position, (6) ADV speed is 27 mph, (7) ADV is 0° with respect to forward motion of ADV, and (8) ADV is 2' to the right of ADV lane left edge. Thus, the features can be encoded as: (100, −72, 25, +90, 60, 27, 0, 2). Each ADV whose logging information was selected in operations 705-725 can have a feature vector for the driving decision of the respective ADV. These feature vectors can be input to a machine learning module 103A and used to generate an improved decision for a plurality of ADVs.

In operation 745, an output can optionally be generated to notify an engineering team of the driving decision, the driving decision parameters, selected logging information, feature vectors used, and decision improvement. Engineers can review the decision before deciding to implement the decision in one or more ADVs. In an embodiment, the improved driving decision can be tested in a set of test ADVs, before implementing the driving decision into non-test ADVs. Method 700 continues at operation 760.

In operation 750, global driving decision improvement module 103B can notify an engineering team of the driving decision to be improved, the driving decision parameters, selected logging information, feature vectors used, and decision improvement. Engineers can determine a decision, and review and test the decision before deciding to implement the decision in one or more ADVs.

In operation 755, global driving decision improvement module 103B can receive the improvement to the driving decision from the engineering team.

In operation 760, a plurality of ADVs can be updated with the improved driving decision.

FIG. 8A illustrates an example perception log 800, according to some embodiments. A perception log 312 (such as example perception log 800) is a log of sensor outputs recorded during a driving scenario. The log identifies objects perceived by ADV sensors, a speed of each object, a location of each object, and an orientation of each object, for a plurality of increments of time. Example perception log 800 represents information obtained at times t0, t1, and t2, for objects: 101 ADV, 510 car, 511 house, 512, man/dog, 513 crosswalk, 514, left edge of lane for ADV 101, and 515, right edge of lane for ADV 101. These are just examples. The data can be represented in a variety of formats, including tables, spreadsheets, database tables, or other formats. For each object, at each time increment, a speed of the object, a location of the object, and an orientation of the object can be recorded in the perception log. In an embodiment, location can be expressed in 2D or 3D coordinates, from which distance can be computed. In an embodiment, location can be stored in polar coordinate format, with a distance from the ADV and angle of rotation from a known point, such as a grid or the orientation of the forward direction of the ADV. In an embodiment, orientation can be with respect to a universal standards, such as North, or a GPS grid. In an embodiment, orientation can be with respect to the forward direction of the ADV. In an embodiment, perception log can additional record an image of one or more of the objects in the log.

In an embodiment, raw sensor outputs may be processed to obtain desired information. For example, an orientation of an object, e.g. car 510, may be obtained using a plurality of outputs from a plurality of sensors. LIDAR may be used to determine a distance (e.g. 101 feet, at time t0) that the car 510 is away from ADV 101. One or more RADAR readings may be used to obtain an orientation of the car 510 with respect to ADV 101 (−75° at time t0). A difference in location of car 510 between times t0 and t1 can be used to determine a speed of car 510 (e.g. 23 mph at t1).

Inferences can be drawn from perception log. For example, viewing the row 101 for the ADV, it can be seen that between time t0 and t2, the ADV 101 is slowing down to a stop. Taking that information, while viewing row 512 man/dog, and row 513 crosswalk, it can be seen that man/dog 512 are nearing the ADV 101 from the right side of the ADV 101, and that the ADV is stopping before reaching the crosswalk 513. The ADV driving decision is to stop before the crosswalk 513 and allow the man/dog 512 to use the crosswalk 513. Similarly, viewing the row for car 510, it can be seen that car 510 approached ADV 101 from the left, and slowed slightly as it crossed in front of ADV 101, while the man/dog 512 used the crosswalk 513.

FIG. 8B illustrates an example driving log 805, according to some embodiments. A driving log records the driving control inputs to the ADV control system 111 at a plurality of increments of time, during a driving scenario. In an embodiment, driving control input data may also be associated with speed, location, and orientation of the ADV when the driving control inputs were logged. In an embodiment, if speed, location and orientation of the ADV 101 is stored in the perception log 800, then the driving log 805 may contain a pointer or other reference to this information in the perception log 800. A driving control input can include a throttle input 202 amount, a brake input 203 amount, and a steering input 201 amount. The steering input 201 amount can indicate a direction of the input (left or right, clockwise or counter-clockwise). A driving control input can also include a derivative of these inputs (not shown), to indicate a rate of change of the driving control input. For example, a high rate of change of the throttle input 202 can indicate that the control module gave a sharp, aggressive throttle input to achieve fast acceleration. Similarly, a high rate of change of braking input 203 can indicate that the control module 111 made as sharp or aggressive application of the brakes, and a high rate of change on the steering input 201. Each of these high rate inputs can have a negative effect on the driving decision grading metrics of passenger and driver comfort, safety, and possibly rule compliance.

FIG. 8C illustrates an example ADV driving decision log 810 according to some embodiments. An ADV driving decision log is a record of driving decisions made by the ADV driving decision module 303 during a driving scenario.

The ADV 101 makes a driving decision for every perceived object, as indicated in the perception logs 800. Example ADV driving decision log shows driving decisions made at each of times t0, t1, and t2, for each object 510 car, 511 house, 512 man/dog, and 513 crosswalk. For example, at time t0, the ADV driving decision may be to overtake the man/dog 512 and the car 510. At time t1, the ADV 101 decision module 303 can use data in the perception module 302 and/or data in the perception log 800 to determine that the ADV 101 is now too close to approaching car 510 to overtake car 510, and too close to crosswalk 513 and man/dog 512 to overtake them as well. Thus, at time t1, based on changes of speed, location and/or orientation of one or more objects, including the ADV 101, the ADV may change its driving decision for one or more objects.

FIG. 8D illustrates an example of planning feedback for a driving decision 815 with reference to an object at a particular time, according to some embodiments. As described above, an ADV driving decision is made for each object perceived by perception module 302 and/or logged in perception log 800. Driving decision module 303 can pass the driving decision, and optionally one or more driving decision parameters, to planning module 304. For example, ADV driving decision module 303 may decide to yield to object 510 car at time t1. Optionally, driving decision module may indicate a rate of slowing to yield to the car 510, or a target location at which the ADV should be when car 510 passes in front of ADV 101. Planning module 304 an receive the decision, and optional decision parameters, and determine whether there may be a problem implementing the decision to yield to car 510. For example, the road may be wet and there may not be time to slow enough to yield to car 510. Alternatively, or in addition, planning module 304 may determine that car 510 is will pass too close in front of ADV 101, unless ADV reduces speed by 10%. Planning module 304 can pass to decision module 304, an indication that a driving decision problem may be present. Planning module 304 can pass the driving decision feedback, and driving decision, back to driving decision module 303. In this example, driving decision feedback can include a warning that car 510 will be too close to ADV at the yield point. Driving decision feedback can further include a recommendation of a more conservative parameter: that the ADV reduce speed by 10%.

FIG. 8E is an example of a driving decision problem recognition module 307 categorizing a driving decision problem, using the driving decision, driving decision feedback, and logging information as may be needed. FIG. 8E also illustrates an example of local driving decision improvement. Logging information can include perception log 312, driving log 313, and driving decision log 314. Driving decision module 303 can receive the driving decision feedback from planning module 304. Driving decision module 303 can call driving decision problem recognition module 307 to categorize a potential driving decision problem. A driving decision problem can include: conservative decision, aggressive decision, conservative parameter, aggressive parameter, early decision, late decision, an non-decision problem (there is a driving decision problem, but it is not related to the decision module 303).

In this example, driving decision module 303 has decided to yield to car 510 with a driving decision parameter of, e.g., 27 mph. Planning module feedback indicates that the driving decision parameter may be too aggressive, and suggests that ADV speed be reduced by 10%. Driving decision problem recognition module 307 can determine that the driving decision problem category is "aggressive parameter," indicating that the driving decision need not change, but a parameter of the driving decision should be changed to a more conservative value.

Driving decision improvement module 308 can utilize the driving decision problem category, the planning module feedback, and logging information to determine a more conservative parameter for the decision to yield to car 510. For example, local driving decision improvement module 308 can reduce ADV speed by the suggested 10%, or another value determined by the driving decision improvement module 308.

FIG. 8F illustrates an example 820 of a global driving decision problem recognition module 103B using logging information from a plurality of ADVs to improve a driving decision for the plurality of ADVs. In this example, the driving decision is to yield to an object, e.g. car 510. In this example, three ADVs (indicated as 1, 2, and 3 under heading 821) have each uploaded logging information to server 103 for analysis by global driving decision improvement module 103B. Logging information can include perception log 312, driving log 213, driving decision log 313, which can include driving decision parameters and driving categorization and planning module feedback. Features can be extracted from the logging information, include features for each ADV and for the object for which the driving decision is made. Logging information from each ADV 1, 2, and 3 has been extracted for a driving decision "yield" to an object, e.g. car 510. For each of ADV 1, 2, and 3, the driving decision was categorized as "aggressive parameter."

A feature vector for each ADV driving decision can be extracted from the ADV's logging information. Features can include ADV speed 831, orientation 832, and lane location 833. Features can further include object 510 distance from ADV 841, relative position to the ADV 842, speed of the object 843, orientation of the object 844 with respect to a grid or the ADV forward driving direction, lane location 845 of the object, and road conditions 846. Features can further include parameter modification 850 suggested by planning module 304 when the driving decision was received by the ADV's planning module. The feature values for an ADV can be arranged into a feature vector. For example, ADV 1 feature vector can be (25, 0°, 3' left, 60', −72°, 24, +90°, −1, and 3), wherein a driving orientation of ↑ (straight ahead) can be indicated by 0° and road conditions can be given on a scale of 1 . . . 5, such as 1=dry, 2=damp, 3=wet, 4=show, 5=ice, sunrise=10, daylight=20, overcast=30, sunset=40, and dark=50. Road conditions can be combined, such day wet and dark could be 3+50=53. Feature vector for ADV 2 can be (32, 0°, 2' left, 80', +28°, 30, −90°, −1, and 1) and ADV 3 feature vector can be (28, 0°, 2' left, 72', −2°, 30, 180°, 3' left, and 51).

Machine learning module 103A can operate over the feature vectors for the driving decision and object to obtain suggested features with which minimal, or no, decision or parameter modifications may be needed. A global change could indicate that, for ADV speed 831 of 25 mph, driving orientation 832 of 0° (or ↑) that a lane location of 2 to 3' to the right of the left edge of the ADV driving lane will not require a decision adjustment for an object that is at a distance 841 of about 68', for all relative positions 842 of the object, the object speed 844 being about 28 mph, wherein the orientation 844 of the object can be any value, the lane location of object 845 can be any location, and the decision will be appropriate for all weather and light. The driving decision improvement should work for most "yield" driving decisions made with reference to a moving object that is travelling at about 28 mph, when ADV is travelling at about 25 mph.

The decision improvement output can be reviewed by an engineering team before implementing the decision improvement in production ADVs. Even after the global driving decision improvement is implemented in production ADVs, the improved decision can still be modified by each car using the local driving decision improvement module 308.

Figure 9:
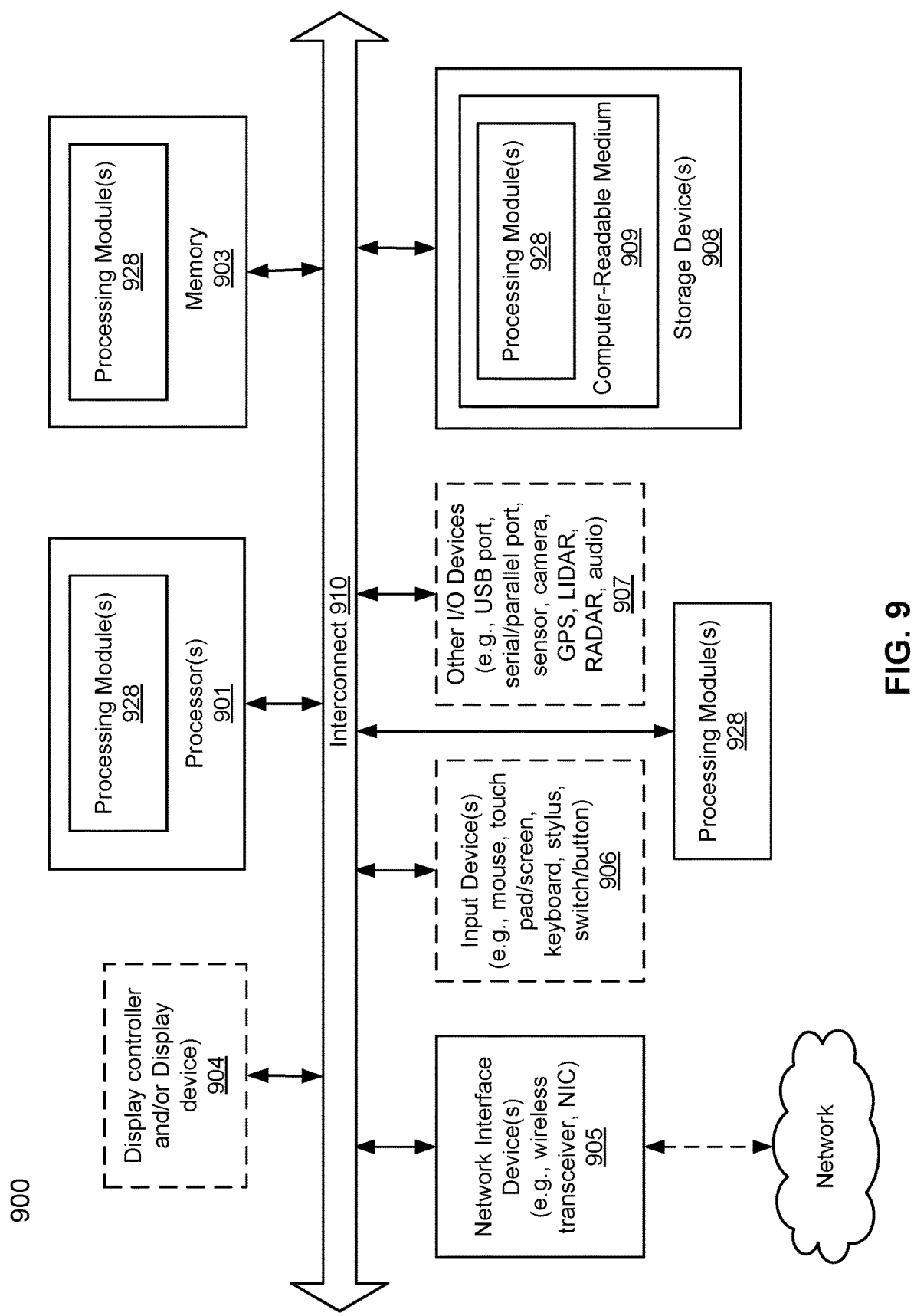
FIG. 9 is a block diagram illustrating a data processing system according to one embodiment.

FIG. 9 is a block diagram illustrating an example of a data processing system 900 which may be used with one embodiment of the invention. For example, system 900 may represent any of data processing systems described above performing any of the processes or methods described above, such as, for example, autonomous vehicle 101 systems, such as perception and planning 110, control system 111, infotainment system 114, etc., or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 901 comprise at least one hardware processor.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900. IO devices 907 may further include a RADAR system (radio detection and ranging), a LIDAR system (light detection and ranging), a GPS system (global positioning system), cell phone subsystems that can detect and triangulate using cell towers, microphone(s), and other, audio/video recording camera(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, autonomous vehicle 101 (AV) localization module 301, perception module 302, driving decision module 303, planning module 304, control module 305, logging module 306, driving decision problem recognition module 307, and decision improvement module 308, and one or more modules to process sensor data to for driving the AV planning and control modules. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   generating a first driving decision based on a first state of the ADV and a second state of an object external to the ADV, wherein each of the first state and the second state includes a speed, a location, and a direction of the ADV and the object respectively;
   receiving planning feedback on the first driving decision, the planning feedback based on the first driving decision, parameters of the first driving decision, the first state, and the second state, wherein the planning feedback is used to classify a problem with the first driving decision into one of a plurality of driving decision problem categories through supervised learning;
   logging the one of the plurality of driving decision problem categories corresponding to the first driving decision problem into logging information, wherein the logging information is combined with other logging information from other ADVs and used to improve a category of the plurality of driving decision problem categories; and
   in response to the planning feedback, utilizing the driving decision problem category to modify a first decision parameter associated with the first driving decision or changing the first driving decision to a second driving decision, and executing either the first driving decision with the modified first decision parameter or executing the second driving decision.

2. The method of claim 1, further comprising:
   determining the first state of the ADV and logging the first state of the ADV into a driving log; and
   determining one or more states of one or more objects external to the ADV and logging the states of the objects into a perception log, including logging the second state, wherein the first driving decision is generated based on the perception log and the driving log.

3. The method of claim 1, wherein the plurality of driving decision problem categories includes:
   a conservative driving decision;
   an aggressive driving decision;
   a driving decision having one or more conservative parameters;
   a driving decision having one or more aggressive parameters;
   an early driving decision;
   a late driving decision; or
   a driving decision having a non-decision problem.

4. The method of claim 1, further comprising executing the first driving decision, if no problem is detected with the first decision.

5. The method of claim 1, wherein the first driving decision comprises one of:
   overtaking an object in the one or more objects,
   yielding to the object in the one or more objects,
   stopping the ADV within a predetermined distance of an object in the one or more objects, or
   ignoring the object in the one or more objects.

6. The method of claim 5, wherein modifying a first parameter of the first driving decision comprises one of:
   modifying a speed at which the ADV overtakes the object;
   modifying a speed at which the ADV slows to yield to the object;
   modifying the predetermined distance at which the ADV stops;
   modifying a position of the ADV within a driving lane occupied by the ADV; or
   modifying an ADV driving path selected to overtake the object.

7. The method of claim 5 wherein changing the first decision to the second decision comprises one of:
   changing an overtake decision to a yield or a stop decision;
   changing a yield decision to a stop decision or an overtake decision;

changing an ignore decision to an overtake, yield, or stop decision.

8. The method of claim 1 wherein the planning feedback comprises at least one of:
an indication ADV speed is too fast or too slow with respect to a location or speed of the object and a location or speed of the ADV;
an indication that the ADV cannot execute the first decision;
an indication that a steering input required to implement the first decision is excessive; or
an indication that decision is unsafe based on one or more road conditions, including weather, amount of light, or lane position of the ADV.

9. A non-transitory machine-readable medium having instructions stored therein, which when executed by a processor, cause the processor to perform operations of operating an autonomous driving vehicle (ADV), the operations comprising:
generating a first driving decision based on a first state of the ADV and a second state of an object external to the ADV, wherein each of the first state and the second state includes a speed, a location, and a direction of the ADV and the object respectively;
receiving planning feedback on the first driving decision, the planning feedback based on the first driving decision, parameters of the first driving decision, the first state, and the second state, wherein the planning feedback is used to classify a problem with the first driving decision into one of a plurality of driving decision problem categories through supervised learning;
logging the one of the plurality of driving decision problem categories corresponding to the first driving decision problem into logging information, wherein the logging information is combined with other logging information from other ADVs and used to improve a category of the plurality of driving decision problem categories, and
in response to the planning feedback, utilizing the driving decision problem category to modify a first decision parameter associated with the first driving decision or changing the first driving decision to a second driving decision, and
executing either the first driving decision with the modified first decision parameter or executing the second driving decision.

10. The medium of claim 9, wherein the operations further comprise:
determining the first state of the ADV and logging the first state of the ADV into a driving log; and
determining one or more states of one or more objects external to the ADV and logging the states of the objects into a perception log, including logging the second state, wherein the first driving decision is generated based on the perception log and the driving log.

11. The medium of claim 10, wherein the plurality of driving decision problem categories includes:
a conservative driving decision;
an aggressive driving decision;
a driving decision having one or more conservative parameters;
a driving decision having one or more aggressive parameters;
an early driving decision;
a late driving decision; or
a driving decision having a non-decision problem.

12. The medium of claim 9, further comprising executing the first driving decision, if no problem is detected with the first decision.

13. The medium of claim 9, wherein the first driving decision comprises one of:
overtaking an object in the one or more objects,
yielding to the object in the one or more objects,
stopping the ADV within a predetermined distance of an object in the one or more objects, or
ignoring the object in the one or more objects.

14. The medium of claim 13, wherein modifying a first parameter of the first driving decision comprises one of:
modifying a speed at which the ADV overtakes the object;
modifying a speed at which the ADV slows to yield to the object;
modifying the predetermined distance at which the ADV stops;
modifying a position of the ADV within a driving lane occupied by the ADV; or
modifying an ADV driving path selected to overtake the object.

15. The medium of claim 13 wherein changing the first decision to the second decision comprises one of:
changing an overtake decision to a yield or a stop decision;
changing a yield decision to a stop decision or an overtake decision;
changing an ignore decision to an overtake, yield, or stop decision.

16. The medium of claim 9 wherein the planning feedback comprises at least one of:
an indication ADV speed is too fast or too slow with respect to a location or speed of the object and a location or speed of the ADV;
an indication that the ADV cannot execute the first decision;
an indication that a steering input required to implement the first decision is excessive; or
an indication that decision is unsafe based on one or more road conditions, including weather, amount of light, or lane position of the ADV.

17. A data processing system, comprising:
a processor; and
a memory coupled to the processor to store instructions, which when executed by the processor, cause the processor to perform operations of operating an autonomous driving vehicle (ADV), the operations including:
generating a first driving decision based on a first state of the ADV and a second state of an object external to the ADV, wherein each of the first state and the second state includes a speed, a location, and a direction of the ADV and the object respectively;
receiving planning feedback on the first driving decision, the planning feedback based on the first driving decision, parameters of the first driving decision, the first state, and the second state, wherein the planning feedback is used to classify a problem with the first driving decision into one of a plurality of driving decision problem categories through supervised learning;
logging the one of the plurality of driving decision problem categories corresponding to the first driving decision problem into logging information, wherein the logging information is combined with other logging information from other ADVs and used to improve a category of the plurality of driving decision problem categories, and in response to the planning feedback, utilizing the driving decision problem category to modify a first decision parameter associated with the first driving decision or changing the first driving decision to a second driving decision, and executing either the first driving decision with the modified first decision parameter or executing the second driving decision.

18. The system of claim 17, wherein the operations further comprise:

determining the first state of the ADV and logging the first state of the ADV into a driving log; and determining one or more states of one or more objects external to the ADV and logging the states of the objects into a perception log, including logging the second state, wherein the first driving decision is generated based on the perception log and the driving log.

19. The system of claim 18, wherein the plurality of driving decision problem categories includes:

a conservative driving decision;

an aggressive driving decision;

a driving decision having one or more conservative parameters;

a driving decision having one or more aggressive parameters;

an early driving decision;

a late driving decision; or a driving decision having a non-decision problem.

20. The system of claim 17, further comprising executing the first driving decision, if no problem is detected with the first decision.

21. The system of claim 17, wherein the first driving decision comprises one of:

overtaking an object in the one or more objects, yielding to the object in the one or more objects, stopping the ADV within a predetermined distance of an object in the one or more objects, or ignoring the object in the one or more objects.

22. The system of claim 21, wherein modifying a first parameter of the first driving decision comprises one of:

modifying a speed at which the ADV overtakes the object;

modifying a speed at which the ADV slows to yield to the object;

modifying the predetermined distance at which the ADV stops;

modifying a position of the ADV within a driving lane occupied by the ADV; or modifying an ADV driving path selected to overtake the object.

23. The system of claim 21 wherein changing the first decision to the second decision comprises one of:

changing an overtake decision to a yield or a stop decision;

changing a yield decision to a stop decision or an overtake decision;

changing an ignore decision to an overtake, yield, or stop decision.

24. The system of claim 17 wherein the planning feedback comprises at least one of:

an indication ADV speed is too fast or too slow with respect to a location or speed of the object and a location or speed of the ADV;

an indication that the ADV cannot execute the first decision;

an indication that a steering input required to implement the first decision is excessive; or an indication that decision is unsafe based on one or more road conditions, including weather, amount of light, or lane position of the ADV.

* * * * *